United States Patent
Prehn

(10) Patent No.: US 10,216,078 B2
(45) Date of Patent: Feb. 26, 2019

(54) INDIVIDUAL VISUALIZATION OF IMAGE INFORMATION CONCEALED IN A LIGHT PROJECTION

(71) Applicant: KOMMANDITGESELLSCHAFT SYNOPTRIX LICHTTECHNIK GMBH & CO., Hamburg (DE)

(72) Inventor: Horst Prehn, Grünberg (DE)

(73) Assignee: KOMMANDITGESELLSCHAFT SYNOPTRIX LICHTTECHNIK GMBH & CO., Hamburg (DE)

( * ) Notice: Subject to any disclaimer, the term of this patent is extended or adjusted under 35 U.S.C. 154(b) by 0 days.

(21) Appl. No.: 15/302,690

(22) PCT Filed: Mar. 23, 2015

(86) PCT No.: PCT/EP2015/056126
§ 371 (c)(1),
(2) Date: Oct. 7, 2016

(87) PCT Pub. No.: WO2015/154982
PCT Pub. Date: Oct. 15, 2015

(65) Prior Publication Data
US 2017/0023852 A1  Jan. 26, 2017

(30) Foreign Application Priority Data
Apr. 8, 2014  (DE) .................. 10 2014 206 793

(51) Int. Cl.
*G02F 1/13* (2006.01)
*H04N 7/16* (2011.01)
(Continued)

(52) U.S. Cl.
CPC .......... *G03B 21/26* (2013.01); *G03B 21/006* (2013.01); *G03B 21/142* (2013.01);
(Continued)

(58) Field of Classification Search
CPC .... G03B 21/26; G03B 21/006; G03B 21/142; G03B 21/2073; G03B 31/00; H04N 7/163; H04N 7/167; H04N 9/3102
See application file for complete search history.

(56) References Cited

U.S. PATENT DOCUMENTS

| 4,859,994 A | 8/1989 | Zola et al. |
| 6,547,396 B1 * | 4/2003 | Svardal ................. G02B 27/26 348/51 |

(Continued)

FOREIGN PATENT DOCUMENTS

| JP | 2008064898 A | 3/2008 |
| JP | 2009145863 A | 7/2009 |

*Primary Examiner* — Nathanael R Briggs
(74) *Attorney, Agent, or Firm* — King & Schickli, PLLC

(57) ABSTRACT

A system (02) is provided with a projection device (01) comprising a light source (03) and an information imprinting device (08) and at least one projection surface (05, 07). The at least one projection surface (05) may have a sectionally phase-maintaining surface. At least one filtering device (11) is arranged between the projection surface (05) and an observation point (15) or a filtering device (09) is arranged independently of the at least one projection surface between an output of the information imprinting device (08) of the projection device (01) and the projection surface (05, 07), wherein the phase modulation is converted into an amplitude modulation by means of the filtering device. Usage of such a system for multistage elective display of information on at least one projection surface (07, 09) is also proposed.

15 Claims, 2 Drawing Sheets

Figure 1:
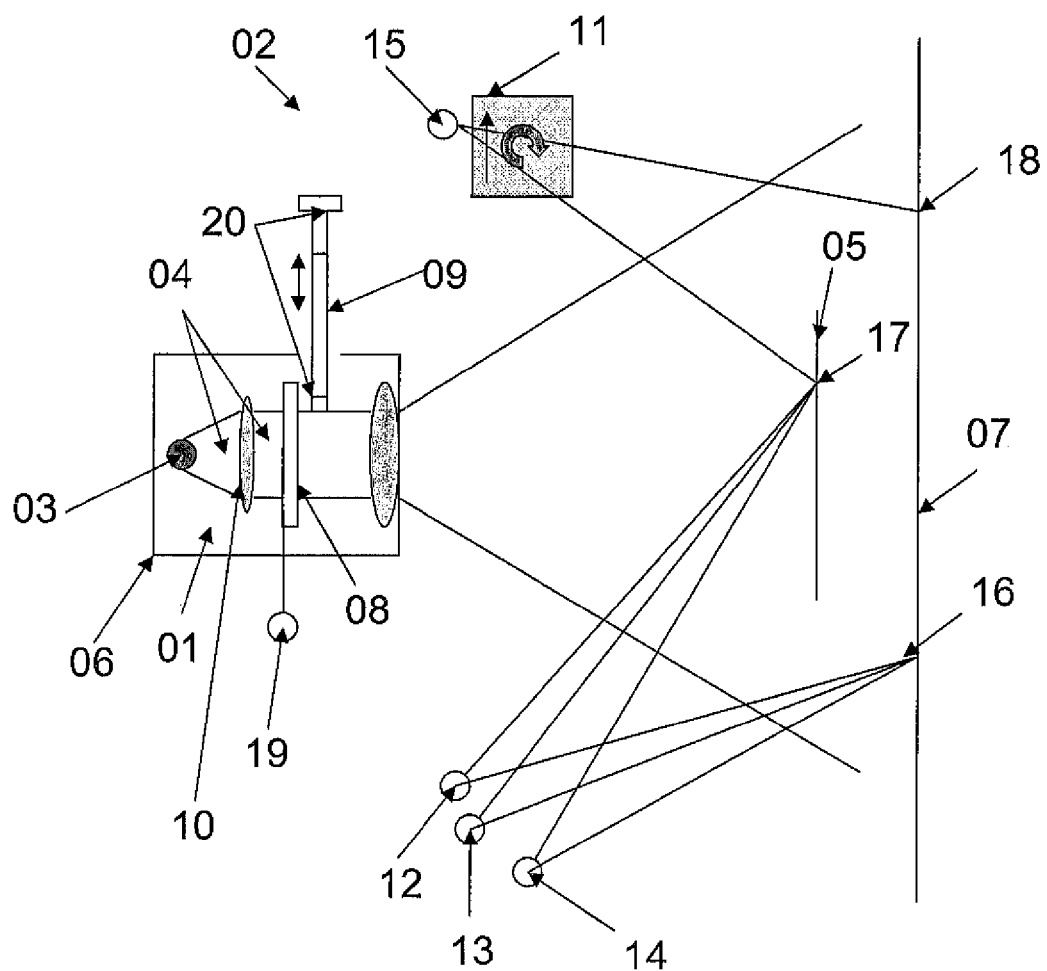

(51) Int. Cl.
*G03B 21/26* (2006.01)
*G03B 21/00* (2006.01)
*G03B 21/20* (2006.01)
*G03B 31/00* (2006.01)
*H04N 9/31* (2006.01)
*H04N 7/167* (2011.01)
*G03B 21/14* (2006.01)

(52) U.S. Cl.
CPC ......... *G03B 21/2073* (2013.01); *G03B 31/00* (2013.01); *H04N 7/163* (2013.01); *H04N 7/167* (2013.01); *H04N 9/3102* (2013.01)

(56) References Cited

U.S. PATENT DOCUMENTS

| | | |
|---|---|---|
| 6,650,306 B2 | 11/2003 | Yerazunis et al. |
| 7,369,100 B2 | 5/2008 | Zacks et al. |
| 8,506,085 B2 | 8/2013 | Azor et al. |
| 2003/0025667 A1* | 2/2003 | Yerazunis ........... G02F 1/13471 345/102 |
| 2004/0165154 A1* | 8/2004 | Kobori ................ G03B 21/26 353/69 |
| 2005/0195330 A1* | 9/2005 | Zacks .................. H04N 7/147 348/564 |
| 2008/0043209 A1 | 2/2008 | Widdowson et al. |
| 2009/0059173 A1* | 3/2009 | Azor ..................... G03B 21/26 353/20 |

* cited by examiner

INDIVIDUAL VISUALIZATION OF IMAGE INFORMATION CONCEALED IN A LIGHT PROJECTION

FIELD OF THE INVENTION

The invention relates to a system for the display of visual information as well as to a usage of such a system.

BACKGROUND OF THE INVENTION

Similar systems are known which enable projecting light in the visible spectral range by means of a projection device, said light appearing as an isotropic light field, in particular as an indiscriminate white light field, for each observer of a reflection of this light, unless the light falls unto a specially prepared surface. In the latter case, information provided invisibly in the projected light is made visible for the observer through the reflection of light on the surface when observing the corresponding specific surface.

Such systems are able to transport optic information to a certain degree, however, it is intended in known systems that the information display is dependent solely on the background or projection surface on which the projection light falls. In a large number of application possibilities, however, it is particularly desirable that the issued information can be rendered or issued, as it were, as flexibly or highly variable as possible. Thereby, the information output or the information display can each be shown or displayed adjusted to the corresponding purpose as well as to the corresponding situation and, if applicable, even individually to the observer of the information.

For visual information has become omnipresent in public spaces nowadays. Image information and textual information on display panels, video walls, marquees and LED displays appear everywhere and more frequently and constantly turn the observer's attention to each piece of information displayed. Due to a commonly observed information overload, in particular through visual information and competing visual presences, important and less important contents and information may no longer be distinguishable from each other. In other words, this means that it is becoming increasingly difficult for the information recipient to actively filter or select pieces of information in order to be presented with an amount of information perceived as pleasant and adequate.

Indeed, it is of particular advantage in some cases that certain visual information is not made generally available to public perception and is only intended for a certain and correspondingly preferential information recipient, so that the information recipient can gather displayed visual information specifically designed for them and only when required, whereas the corresponding image content should not be perceivable for all other observers.

SUMMARY OF THE INVENTION

Correspondingly, it is the object of this invention to further develop a corresponding system as well as to propose a corresponding usage of the further developed system, wherein the system and the usage of the system enables a highly flexible display of visual information.

The object is attained by a system according to the independent claim 1 as well as by a corresponding usage of a system according to claim 15. Advantageous aspects of the invention at hand are subject to the subclaims.

The system for the display of visual information according to the invention comprises a projection device comprising a light source and an information imprinting device which is operative to a two-dimensional spatial and in particular temporal imprinting of information by means of a phase modulation to a beam path of the projection device. Furthermore, the system comprises at least one projection surface as well as electively at least one filtering device, wherein the basic idea of the invention is realized by the system electively having at least one sectionally phase-maintaining surface and thereby further electively, if intended, the filtering device is arranged in an output beam path between the at least one projection surface and an observation point, or electively the filtering device is arranged independently of the at least one projection surface in an projection beam path of the projection device, in fact electively arranged at a position intended thereto between an output of the information imprinting device and the projection surface.

In this application, phase modulation is to be understood as the specific change of the phase and/or the polarization of the radiation of individual beam rays. Phase preservation in this context therefore constitutes the ability of individual rays to maintain the corresponding phase relationship to other rays. A filtering device, which can filter or make phase-modulated information visible, respectively, is designed in such a way that light or rays with different phase or different polarization selectively pass or do not pass the filtering device and, in the case of non-passage, is filtered, wherein a conversion of the phase modulation invisible to the naked eye into an amplitude modulation is realized and by which means the information in turn is made visible. In order to even enable such phase modulation, the system proposed presupposes a light source which provides light or radiation having a well-defined, in particular homogenous, phase relationship or polarization. An information imprinting device is correspondingly an active, optic element or component which is designed in such a way that it can selectively change certain characteristics of radiation.

Due to the corresponding system a particularly large variety of different forms of information display is enabled. That way, for example, the information to be displayed can be displayed from every observation point and independently from the projection surface, namely when the filtering device is arranged in the input beam path between an output of the information imprinting device and the projection surface.

Alternatively, however, a selective display of information dependent on the reflection surface can be carried out, wherein on this occasion the display of information according to the system proposed additionally depends on whether a corresponding filtering device is intended in a corresponding reflection beam path between the projection surface and the observation point. In other words, this means that the light emitted by the projection devices then appears as an isotropic light field when it falls on any, in particular non-phase-maintaining, projection surface and additionally, also in the case of reflection off a phase-maintaining reflection surface, is only then not perceived as an isotropic light field when a filtering device is arranged between the phase-maintaining projection surface and the observation point.

The latter optional embodiment of the system in particular offers the advantage that specific visual information, like for example texts, musical scores or accompanying recordings of background information or videos and the sort at a stage event or in connection with exhibition pieces of an exhibition, do not appear at any observation point of the projection but are still displayed individually at any observation point when a corresponding filter device is arranged in the output beam path.

A particular advantage of the system proposed is that the light or radiation emitted from the projection device is each perceived as a conventional illumination, like the radiation produced by a common light source, even if the light or radiation is not reflected by a phase-maintaining surface of a projection surface, or a corresponding filtering device is not arranged in the output beam path.

Overall, according to the invention a phase modulation is produced by an information imprinting device, thus attaining the imprinting of information to the light beam. Thereby, a phase modulation is produced in an information imprinting device for each individual segment (pixel) of the light beam dependent on a corresponding electric control signal.

The material characteristic at hand, which is used to produce a phase modulation by means of an information imprinting device, for example is optic double refraction. Each segment of the information imprinting device can therefore influence the polarization condition and the phase of the light or radiation differently by means of an electric control signal (modulation).

The phase modulation according to the invention is to be understood in such a way that a specific change of the corresponding phase modulation of each individual segment within the information imprinting device takes place with a certain amount of segments (pixels).

The information imprinted by a phase modulation of the light, however, remains invisible to the naked eye, since thereby no amplitude modulation is carried out and therefore no information or rather image content can be gathered due to varying brightness.

Therefore, the basic idea of this invention also is based on that an information imprinting device selectively can be used for phase modulation as well as for amplitude modulation. The conversion of the invisible phase modulation into a visible amplitude modulation takes place with the help of an additional filtering device in the output beam path in the simplest case.

Due to the application of the conversion possibility between phase modulation and amplitude modulation in connection with the correspondingly claimed adaptable embodiments of the light projection having phase modulation as well as the additional application of phase-maintaining projection surfaces and if applicable, in connection with the optional filtering devices also designated for different corresponding applications, the information display according to the invention can be designed in a particularly flexible way.

As made clear in the preceding description, a large number of different configurations, up to a personal configuration of every observation point, and a correspondingly adjusted display of information are thereby enabled by the system proposed.

According to a first variant of the system, it is intended that the information imprinting device is formed as a spatial light modulator, wherein a spatial light modulator describes a component which effects the spatially and temporally selective influence of radiation regarding phase, amplitude or polarization. In the broad sense of the invention, an electro-optic modulator (OEM) is to be understood and comprised in this embodiment as a general form of a spatial light modulator as well. An electro-optic modulator also specifically changes the phase and the polarization of individual rays of a beam ray.

Additionally, it is particularly advantageous if the spatial light modulator comprises a liquid crystal panel (LC panel), in particular a liquid crystal panel on silicon (LCoS). In other words, such an LC panel constitutes a component formed for particular purposes, for example for projection, in the form of a spatial light modulator which effects that the radiation is modulated in transmission (LCD) by the LC panel or in reflection on the LC panel (LCoS), wherein the modulation can be controlled separately in each point (pixel) of the LC panel. A video signal, for example, can be used as a signal generator for such a control of the LC panel. Such liquid crystal panels are already broadly used in projection technology and are therefore available in correspondingly high quality while being relatively inexpensive at the same time. Moreover, the liquid crystal panels have a particularly good characteristic regarding the imprint of information to a beam path by means of phase modulation. This way, such liquid crystal panels enable, for example, a high temporal resolution of the phase modulation or information imprinting, so that information in the form of a temporal sequence of two-dimensional images can be imprinted to the beam path, which can be perceived as moving images from a corresponding observation point using corresponding phase modulation and subsequent modulation conversion of a phase modulation into an amplitude modulation.

It is also particularly advantageous if several such liquid crystal panels are comprised by the information imprinting device. In this case, each liquid crystal panel can be designed in such a way that information is imprinted in a specific color to the beam path of the projection device, so that multicolor or colorful information can be displayed using the corresponding overlap, depending on the projection surface and the arrangement of the filtering device. Thus it is intended that the information imprinting device comprises several, in particular three, liquid crystal panels, wherein each liquid crystal panel imprints information in a specific color to the beam path of the projection device.

Moreover, the high flexibility in the display of information is further developed particularly advantageously by means of the system proposed if the projection device comprises a changing device formed for receiving a filtering device, wherein the changing device enables the insertion and extraction of the filtering device either into or out of the beam path of the projection device.

On the one hand, it is thereby achieved that the filtering device is arranged in the projection device itself when arranged in the input beam path, whereby the system proposed becomes particularly compact. Moreover, such a changing device of the projection device enables the filtering device to cover the entire beam path within the projection device. Thus, ultimately, a particularly convenient and fast reconfiguration of the system proposed is enabled, namely between the selective condition, in which the display of information is enabled independent of the nature of the projection surface and the observation point, and the likewise selective condition, in which a display of information is enabled only when positioning the filtering device in the reflection beam path starting from the at least one projection surface as well as under the corresponding phase-maintaining nature of the surface of the projection surface.

Furthermore, it is particularly advantageous for the system proposed if the at least one projection surface is formed translucently. In this case, the system can be designed in the form of a rear projection system, wherein the flexibility described above can be equally realized by the corresponding selective formation of the system.

In the event that a rear projection system is to also comprise an at least sectionally phase-maintaining surface by means of a translucent projection surface, it may be provided that a translucent projection surface is created by means of a foil or another transparent carrier to which corresponding coating materials are applied, said projection surface comprising a suitable image contrast as well as at least partially or sectionally phase-maintaining characteristics or a phase-maintaining surface. An equivalent can be achieved with a logo film, for example.

Alternatively, however, it may also be provided that at least one projection surface is formed reflectively. For this, either an arbitrary reflective projection surface or a corresponding phase-maintaining reflective projection surface can be chosen. If such reflective projection surfaces are chosen, a large spatial distance between the projection device and the corresponding projection surface(s) can be covered particularly advantageously.

The system proposed is particularly suitable for either a multiple optional or selective display of information in cultural institutions, such as museums, theaters and similar institutions. Therefore it may be provided that at least one projection surface of the system is formed by an object to be illuminated, in particular an exhibition piece. Equally, artists as well as backdrops or parts of backdrops are just as suitable as a corresponding projection surface. In the event of the illumination of an exhibition piece which generally does not comprise a corresponding phase-maintaining surface, a corresponding illumination of the booth or exhibition is still always achieved by the corresponding system, wherein not only an optional and/or selective display of information on or in the area of the exhibition piece can be achieved with the system proposed, but moreover a required or desired illumination is carried out simultaneously as well.

Moreover, it is particularly advantageous if the filtering device is formed as a phase filter. Thus a simple and effective conversion of the phase modulation by the information imprinting device is enabled. In other words, the filtering device is an optic element or component, in this embodiment, which lets a light wave being, for example, linearly polarized pass selectively regarding its phase and direction. The filtering device is correspondingly used for selective conversion and thus for a modulation conversion of a phase modulation into an amplitude modulation, whereby the information imprinted in the radiation is transferred from a phase modulation into an amplitude modulation, ultimately making the information visible.

It is particularly very advantageous if a filtering device of the system, arranged in the output beam path, comprises a variable, in particular spatially variable, filtering device. This allows to adjust the filtering device at every observation point in such a way that an optimal filtering effect or rather conversion effect is achieved and thus the visual information, which was imprinted by the information imprinting device of the projection device to the beam path of the projection device, can be filtered or rather converted into an amplitude modulation at the observation point visible for the naked eye.

Additionally advantageous is if the filtering device in the output beam path is formed as a mobile filtering device, in particular as a binocular filtering device. Such filtering devices can be formed in the form of glasses, for example, which comprise corresponding filters as lenses or rather instead of the lenses. In combination with the preceding embodiment, such filtering glasses can be designed in such a way that the corresponding desired orientation of the filtering direction is achieved by rotation of the filtering device(s) or rather the lenses.

In total, the selective or optional display of information is thus simply enabled by putting on or taking off the corresponding filtering glasses. Moreover, reflected light or light from the output beam path, which has been reflected by a projection surface at least sectionally equipped with a phase-maintaining surface and comprises corresponding information imprinted by means of the information imprinting device, can be displayed at any observation point, at which the corresponding reflected light or part of the output beam path arrives.

It can also be particularly advantageous if the system proposed also comprises an output device for acoustic information. This allows an even further individualized or optionally selective information transfer.

It is also advantageous if a corresponding acoustic output device is designed as a mobile, in particular personal, output device. Such output devices can be provided in form of small speakers, for example, or different types of headphones.

The information transfer by means of the system proposed can be further developed particularly advantageously when provided with an acoustic output device if the projection device and the at least one acoustic output device are connected informationally and, in particular, are synchronized to each other. This allows that visual information and acoustic information, for example, can correspondingly be conveyed alternately or parallel, respectively, simultaneously.

The object of the invention at hand is moreover the usage of a system in one of the embodiments described above, wherein the usage of the system enables a multistage elective display of information on at least one projection surface, wherein the usage electively enables one the following: the display of no information whatsoever despite operation of the light source, in particular for illumination purposes; the display of information in correlation of the spatial arrangement of at least one projection surface, a filtering device and an observation point as well as the nature of the projection surface; and, ultimately and also electively, the display of information independent of the observation point as well as the nature of the projection surface. Such a usage of the system allows the optimal adjustment of the system to the corresponding operating conditions and simultaneously a maintaining of high flexibility regarding each display of information.

BRIEF DESCRIPTION OF THE DRAWING FIGURES

In the following, individual embodiments of the system proposed are explained with examples in reference to the drawings.

Figure 2A:
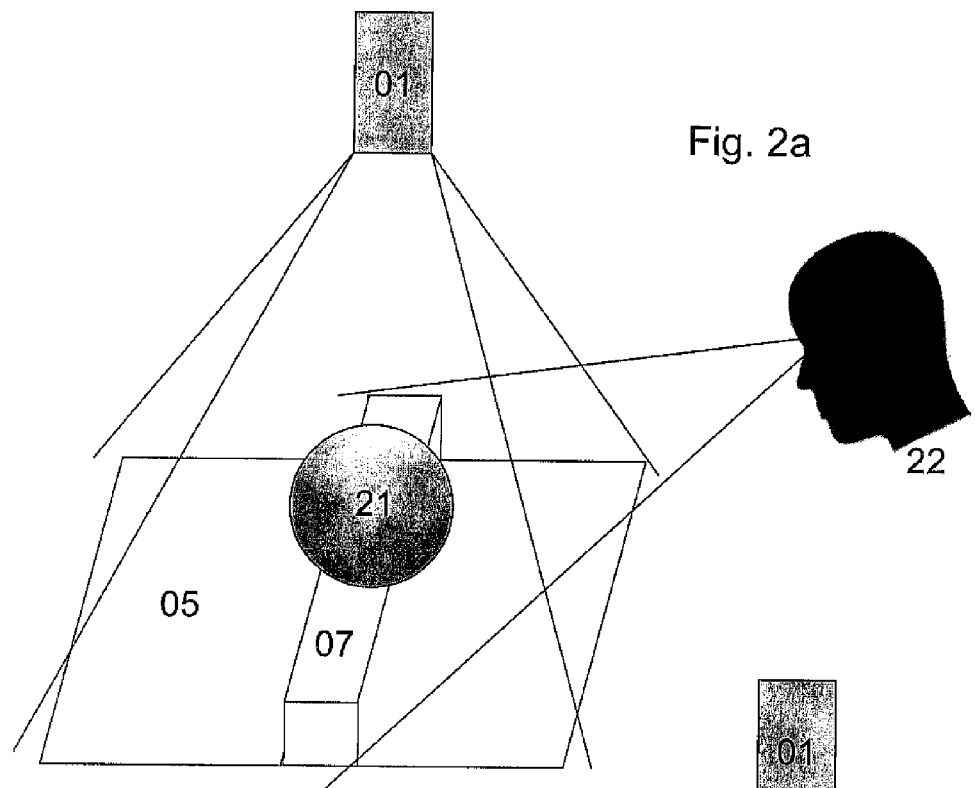
Figure 2B:
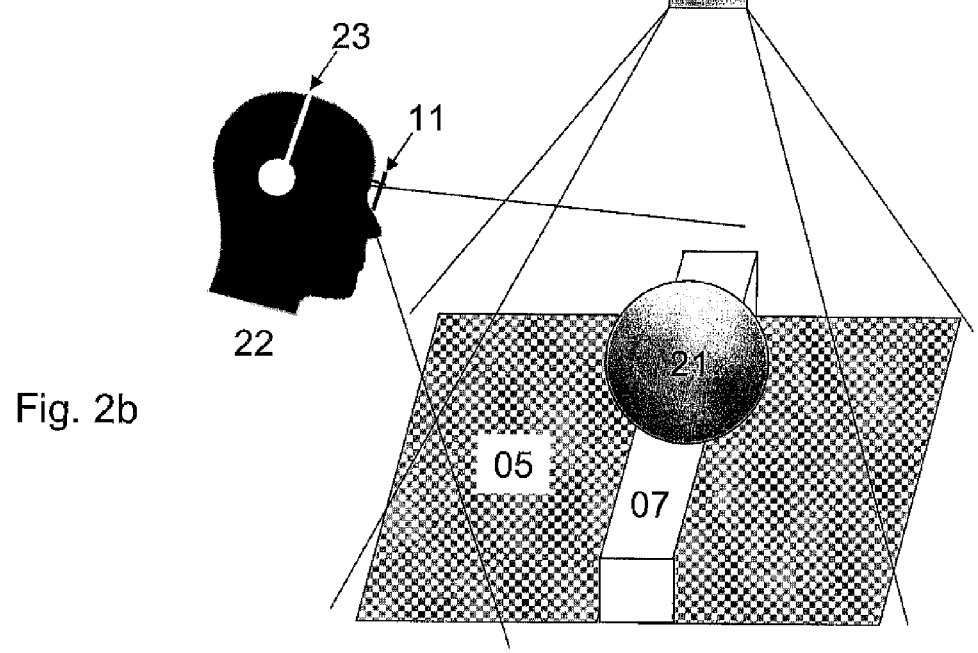

In the figures:

FIG. 1 shows a system according to the invention in a first embodiment variable in itself FIG. 2a shows a system according to the invention in a second embodiment; and FIG. 2b shows a system according to the invention in a third embodiment.

FIG. 1 shows a projection device 01 having a light source 03 as well as two projection surfaces 05 and 07. The system 02 of FIG. 1 shows the two alternative arrangements of two filtering devices 09 and 11. Moreover, four exemplary observation points 12 through 15 are illustrated as well as the output beam paths, starting from the observation points 12 through 15, from three image points 16 through 18 of the projection surface 05 and 07 to the corresponding observation points 12 through 15.

DETAILED DESCRIPTION OF THE INVENTION

As can be easily seen in FIG. 1, the system proposed is designed as a reflection system, in contrast to the rear projection system, having corresponding reflective projection surfaces 05 and 07. In total, the light source 03 of the projection device 01 creates a light or electromagnetic radiation in the visible frequency range with a well-defined, in particular over the two dimensional extent of the beam path 04, constant phase orientation or phase adjustment. To this end, either corresponding light sources 03 can be used which produce such uniform light or rather light uniform in the phase relationship or an optic 10 can be provided which produces a corresponding uniform phase relationship of any light source. Since reflection systems are concerned, all rays between the light source 03 and the projection surfaces 05, 07 are to be understood as input beam paths and the rays or the radiation, respectively, which are reflected from the projection surfaces 05, 07, are to be understood as output beam paths. In other words, this means that the terms input beam path and output beam path are defined with respect to the projection surfaces 05, 07.

Besides the light source 03, an information imprinting device 08 is also arranged inside a casing 06 of the projection device 01, said information imprinting device 08 imprinting information by means of selective phase modulation in individual rays of the beam path or for the individual image points in the beam path 04 of the projection device, for example through liquid crystal panels not illustrated. The spatial as well as temporal selective phase modulation by means of the information imprinting device 08 takes place via corresponding control signals which are provided by a control device 19 arranged externally to the projection device, for example.

Accordingly, the radiation or light leaves the projection system correspondingly phase-modulated in a first condition of the system, as illustrated in FIG. 1. The radiation is then reflected by the two projection surfaces 05 and 07 and reaches the observation points 12 through 15. In the example of FIG. 1, the projection surface 05 is a projection surface with an at least sectionally phase-maintaining surface. In contrast to this, the projection surface 07 is an arbitrary projection surface. The phase information in the radiation reflected off the projection surface 05 is still available in the observation points 12, 13 and 14, however, a corresponding filtering device is missing at these observation points or rather in the output beam path of the projection surface 05 to the observation points 12 through 14 in order to convert the corresponding information and thus making it visible. Thus the radiation reflected by the projection surface 05 appears in the observation points 12 through 14 only as an undifferentiated isotropic light field.

At the observation points 12 through 14, the radiation reflected by the projection surface 07 also arrives as an undifferentiated isotropic light field since the phase modulation produced by the information imprinting device has been lost during the reflection on the projection surface 07 through the non-phase-maintaining characteristic of the projection surface 07.

At the observation point 15, however, a corresponding filtering device 11 is located in the output beam path between the projection surface 05 and the observation point 15 as well as in the output beam path between the projection surface 07 and the observation point 15. Correspondingly, the information within the radiation reflected by the projection surface 05 can be converted at the observation point 15 and thus can be made visible or be displayed. As indicated by the two arrows of the filtering device 11, the filtering device displays a certain filtering direction, which can be adjusted by means of suitable adjustment means. In contrast, a display of information in the observation point is not possible even with the provided filtering device 11 for radiation reflected by the projection surface 07 since the corresponding phase modulation has been lost due to the non-phase-maintaining reflection on the arbitrary projection surface 07.

Another filtering device 09 is also displayed in FIG. 1, which is received by a changing device 20 and is moveable regarding the projection device 01 together with the changing device, as is indicated by the arrow in FIG. 1. In the event that the filtering device 09 is inserted into the beam path 04 of the projection device 01 with the changing device 20, a conversion of the phase modulation produced by the information imprinting device 08 takes place within the projection device before the radiation has even left the projection device. In this condition not illustrated in FIG. 1, the corresponding visual information is made visible on all observation points 12 through 15 and independently of the respective projection surface 05 and 07. Correspondingly, the filtering device 11 is dispensable or rather has no further effect on the display of visual information or its perceptibility in dependence of the projection surface or the observation point.

FIG. 2a shows a system which comprises a projection device 01, a first projection surface 05 having a phase-maintaining surface, a second projection surface 07 having an arbitrary nature as well as a third projection surface 21 formed by an exhibition piece. The silhouette shown in FIG. 2a represents an observation point 22 from which a projection surface 05, 07 and 21 can be observed. Further, in the example of FIG. 2a, no filtering device whatsoever is provided. Correspondingly, even the radiation of the projection device 01 reflected by a projection surface 05 having a phase-maintaining surface cannot be converted into an amplitude modulation at the observation point 22. Subsequently, the radiation reflected by the projection surface and starting from the projection device in total appears as an undifferentiated isotropic light field at the observation point 22. In other words, this means that the projection device 01 is only perceived as a common illumination of all projection surfaces at the observation point 22.

The system illustrated in FIG. 2b is mostly identical to the system of FIG. 2a. Additionally to the condition of FIG. 2a, however, a filtering device is provided in the output beam path between the observation point 22 and the projection surfaces 05, 07 and 21. This filtering device is designed as a mobile and binocular filtering device in form of glasses comprising corresponding filtering elements as lenses or rather instead of lenses. As indicated by the shading of the projection surface 05 in a chessboard-like pattern in FIG. 2b, the visual information provided by means of phase modulation in the radiation coming from the projection device 01 is made visible or rather displayed at the observation point 22 by providing the corresponding filtering device 11. Moreover, the radiation by the projection surface 07 and the projection surface 21 is perceived as an undifferentiated isotropic light field or rather as a uniform but unstructured illumination of the projection surfaces 07 and 21 at the observation point 21.

As is easily recognizable in the comparison of FIGS. 2a and 2b, one of the advantageous effects of the system proposed consists of being able to display or perceive additional visual information at an observation point 22 depending on the provision of a filtering device 11 in the corresponding output beam path. Subsequently, an individual display of information is possible which is enabled by the observer putting on the corresponding glasses having a filtering effect at the observation point 22.

As schematically illustrated in FIG. 2b, the system comprises moreover an acoustic output device in form of a mobile, personal output device 23. This enables, adapted to the corresponding visual information, the providing of additional or alternative acoustic information at observation point 22.

The invention claimed is:

1. System (02) for the display of visual information comprising:
   a projection device (01) comprising a light source (03) and an information imprinting device (08) configured to imprint at least two-dimensional spatially and in particular temporally resolved information by means of phase modulation to a beam path (04) of the projection device;
   the system (02) comprising a first projection surface (05) which is at least partially phase-maintaining, a first filtering device (11) configured to be arranged in an output beam path between the first projection surface (05) and an observation point (15), a second filtering device (09) configured to be arranged in an input beam path between an output of the information imprinting device (08) and the first projection surface (05), wherein the phase modulation is converted into an amplitude modulation by the first and second filtering devices (9, 11),
   characterized by second projection surfaces (07, 21) having a non-phase maintaining surface, wherein the second projection surfaces (07, 21) comprise an object (21), in particular an exhibition object or a display item to be illuminated without information imprinting,
   wherein the system is configured to:
      illuminate the object (21) with the display of no information on the object whatsoever despite the operation of the light source, in particular for lighting purposes; or
      display information on the first projection surface (05) as a function of the spatial arrangement of the first and second projection surfaces (05, 07, 21), the first and second filtering devices (09, 11) and an observation point (15) as well as of the composition of the first projection surface (05); or
      display information on the first projection surface (05) or on the second projection surfaces (07, 21) independent of the observation point (12, 13, 14, 15) and independent of the nature of the first and second projection surfaces (05, 07, 21).

2. The system according to claim 1, characterized in that the information imprinting device (08) comprises at least one spatial light modulator (SLM).

3. The system (02) according to claim 2, characterized in that the spatial light modulator comprises at least one liquid crystal panel (LC panel), in particular a liquid crystal panel based on silicon (LCoS panel, Liquid Crystal on Silicon).

4. The system (02) according to claim 3, characterized in that the information imprinting device (08) comprises several, in particular three, liquid crystal panels, wherein each liquid crystal panel imprints information in a specific color to the beam path of the projection device.

5. The system (02) according to claim 1, characterized in that the projection device (01) comprises a changing device (20) operative to receive the second filtering device (09), the changing device (20) enabling the insertion and extraction of the second filtering device (09) into or out of the beam path (04) of the projection device (01).

6. The system (02) according claim 1, characterized in that at least one the first and second projection surfaces (05, 07) is formed translucently.

7. The system (02) according to claim 1, characterized in that at least one of the first and second projection surfaces (05, 07) is formed reflectively.

8. The system (02) according to claim 1, characterized in that the first or second filtering device (09, 11) is designed as a phase filter.

9. The system (02) according to claim 1, characterized in that the first filtering device (11) comprises a variable spatial filtering device in the output beam path.

10. The system (02) according to claim 1, characterized in that the first filtering device (11) in the output beam path is formed as a mobile filtering device, in particular a binocular filtering device.

11. The system (02) according to claim 1, characterized in that the system further comprises an output device (23) for acoustic information.

12. The system (02) according to claim 11, characterized in that the at least one acoustic output device (23) is designed as a mobile, in particular personal, output device.

13. The system (02) according to claim 11, characterized in that the projection device (01) and the at least one acoustic output device (23) are designed such that they are informationally connected, in particular synchronized with each other.

14. Usage of a system according to claim 1 for multistage elective display of information on the first and second projection surfaces (05,07,21), characterized in that the usage electively enables:
   illumination of the object (21) with the display of no information on the object whatsoever despite the operation of the light source, in particular for lighting purposes; or
   the display of information on the first projection surface (05) as a function of the spatial arrangement of the first and second projection surfaces (05, 07, 21), the first and second filtering devices (09, 11) and an observation point (15) as well as of the composition of the first projection surface (05); or
   the display of information on the first projection surface (05) or on the second projection surfaces (07, 21) independent of the observation point (12, 13, 14, 15) as well as independent of the nature of the first and second projection surfaces (05, 07, 21).

15. System for the display of visual information comprising:
   a projector comprising a light source, the projector adapted to imprint at least two-dimensional spatially and temporally resolved information by phase modulation to a beam path;
   a phase-maintaining projection surface;
   a first filter arranged in an output beam path between the phase-maintaining projection surface and an observation point, and a second filter arranged in an input beam path between an output of the projector and the phase-maintaining projection surface, wherein the phase modulation is converted into an amplitude modulation by the first and second filters, a non-phase maintaining projection surface formed by an object to be illuminated without information imprinting wherein the system is configured to:
- illuminate the object with the display of no information on the object whatsoever despite the operation of the light source, in particular for lighting purposes; or
- display information on the phase-maintaining projection surface as a function of the spatial arrangement of the projection surfaces, the first and second filters and an observation point as well as of the composition of the phase-maintaining projection surface; or
- display information on the phase-maintaining projection surface or on the non-phase maintaining projection surface independent of the observation point and independent of the nature of the projection surfaces.

* * * * *